(12) United States Patent
Gravier

(10) Patent No.: US 6,582,646 B1
(45) Date of Patent: Jun. 24, 2003

(54) METHOD FOR PRODUCING A MECHANICAL PART PROVIDED WITH A PLASTIC MOULDED LINING

(75) Inventor: Stéphane Gravier, Lyons (FR)

(73) Assignee: Freudenberg (Limited Liability Company), Macon (FR)

( * ) Notice: Subject to any disclaimer, the term of this patent is extended or adjusted under 35 U.S.C. 154(b) by 0 days.

(21) Appl. No.: 09/621,196

(22) Filed: Jul. 21, 2000

(30) Foreign Application Priority Data

Jul. 21, 1999 (FR) .............................. 99 09628

(51) Int. Cl.⁷ .................. B29C 45/14; B29C 70/76
(52) U.S. Cl. .................. 264/242; 264/267; 264/273; 264/274; 264/275
(58) Field of Search ................ 264/242, 250, 264/255, 259, 267, 268, 271.1, 275, 274, 273

(56) References Cited

U.S. PATENT DOCUMENTS

| | | | | |
|---|---|---|---|---|
| 3,861,646 A | * | 1/1975 | Douglas | 251/332 |
| 4,067,093 A | * | 1/1978 | Schumacher et al. | 264/274 |
| 5,008,060 A | * | 4/1991 | Kanai et al. | 264/250 |
| 5,672,025 A | * | 9/1997 | Yagi et al. | 264/250 |
| 5,846,470 A | * | 12/1998 | Funatsu et al. | 264/271.1 |
| 5,851,472 A | * | 12/1998 | Kashiyama | 264/267 |

FOREIGN PATENT DOCUMENTS

| | | |
|---|---|---|
| DE | 2353286 | 5/1974 |
| DE | 19618013 | 11/1997 |
| EP | 02236062 | 9/1990 |
| EP | 0583599 | 2/1994 |

* cited by examiner

Primary Examiner—Angela Ortiz
(74) Attorney, Agent, or Firm—Ladas & Parry

(57) ABSTRACT

The invention concerns a mechanical part including a body (2) provided with a plastic lining (3) defining at least one operational contact surface (S) with another mechanical part (C) with respect to which the first mechanical part is mobile. According to the invention, the plastic lining (3) is moulded on the body (2). The invention also concerns the method for producing said part.

7 Claims, 3 Drawing Sheets

METHOD FOR PRODUCING A MECHANICAL PART PROVIDED WITH A PLASTIC MOULDED LINING

The invention concerns the technical and mechanical field and more particularly the field for the production and implementation of mechanical parts which, in order to function, need to comprise plastic linings intended to provide a sealing function.

In one preferred, but not exclusive, sphere of application of the invention on the brake circuit for a motor vehicle, the method is known on how to implement inside a hydraulic control cylinder known as a wheel cylinder a piston generally made of metal provided with a plastic or elastomer, such as rubber, sealing lining. This piston most often includes a peripheral throat inside which the elastomer annular-shaped lining is forcefully mounted or forms an extension.

To the extent that they have successfully passed quality controls, if the mounted pistons give full satisfaction concerning their functioning, this production mode does have a certain number of drawbacks which, without still being redhibitory, nevertheless adversely affect performances linked to the use of said piston and to a lesser extent those linked to the production of pistons.

In fact, the placing of the elastomer lining in its housing throat require a temporary deformation of the lining which can result in a local tearing, indeed a full breaking of the lining. Local tears result from damage to the lining when handled or when mounted with a defective tool, or may occur when the elastic deformation limit of the lining is reached during mounting. Thus, the various operations carried out on the lining are likely to render a lining defective which, prior to being produced, conformed with the required quality criteria.

Full tearing occurring during the piston production process results in the damaged lining being unusable and needs to be replaced by a full lining. This loss of lining nevertheless increases the production cost of pistons.

On the other hand, local tears could have more serious consequences. In fact, these tears are not always visible after mounting and the piston bearing a damaged lining may in certain cases successfully pass the various quality controls which are most frequently visible. Thus, the piston with its lining affected by microcracks is likely to be used in the brake circuit of a vehicle. Now, microcracks or tears may result in a rupture of the lining during use and thus a total malfunctioning of the wheel cylinder on which the defective piston is mounted. This hidden defect can therefore have economic and personal consequences much more serious than those resulting from breaking of the lining when the latter is mounted.

Furthermore, it needs to be noted that the various handlings made to the lining between the time it is produced and the time it is mounted also constitute risks of the lining being soiled and polluted by foreign particles likely to affect the proper functioning of the system integrating the mechanical part equipped with the lining.

It thus appears there is a need to have available a new method for producing said pistons making it possible to reduce as much as possible the risk of hidden defects on the lining equipping the piston. It needs to be noted that there is a similar problem concerning all mechanical parts on which it is necessary to use a plastic lining to the extent that mounting of the lining is likely to damage the latter.

So as to resolve said drawbacks, the invention concerns a new method for producing a mechanical part provided with a plastic lining and is able to advantageously reduce the stresses applied to the lining both before and after mounting so as to avoid any risk of said lining deteriorating.

Therefore, the invention concerns a method for producing a mechanical part including a body provided with a plastic moulded lining defining at least one operational contact surface with another mechanical part with respect to which the first mechanical part is mobile.

Moreover, depending on the function of the mechanical part, it may be necessary to define in the moulded lining a recess or chamber. Now known production methods do not make it possible to embody this recess and more particularly so when the lining surrounds the mechanical part and needs to have a radially open chamber. Thus, it seems essential to have available a new moulding method to attain this objective.

So as to attain this objective, the invention concerns a method for producing a mechanical part including a body provided with a plastic lining defining at least one operational contact surface with another mechanical part with respect to which the first mechanical part is mobile.

According to the invention, the method consists of:
using a mould including a main body and at least one secondary core,
placing as the central core the body of the mechanical part in the main body of the mould,
placing the secondary core by at least partially inserting the secondary core in the body of the part forming the central core,
closing the mould,
injecting the plastic material,
opening the mould,
removing the secondary core,
and extracting the mechanical part from the main body of the mould.

According to one characteristic of the invention, the method consists of adjusting the position of the piston of the secondary core with respect to the body to the position of the main body of the mould.

According to another characteristic of the invention, the method consists of using a mould including at least two additional secondary cores nested inside the main body of the mould so that in the mould closed position the position of the secondary cores is adjusted by this nesting.

According to another characteristic of the invention, the method consists of inserting, at least in part, the recess of the secondary cores in a peripheral moulding throat shown by the body of the part forming the central core so as to define an annular chamber in the moulded lining.

According to a further characteristic of the invention, the method consists of fitting in the body of the mechanical part at least one injection channel for passage of the plastic material constituting the lining.

Again, according to another characteristic of the invention, the method consists of using a mould designed in such a way that each functional surface of the lining is formed by one of the elements constituting the mould so as to have functional surfaces without any mould parting line.

The invention also concerns a mechanical part comprising a plastic lining embodied so that the lining is not subjected to stresses at the time it is mounted on the part and exhibits no residual stress after being placed.

So as to attain this objective, the invention also concerns a mechanical part including a body provided with a plastic moulded lining defining at least one functional contact surface with another mechanical part with respect to which the first mechanical part is mobile.

According to the invention, the part is characterised in that the plastic lining is moulded in a peripheral throat shown by the body so as to surround said body and comprises at least one radially open annular chamber.

According to one characteristic of the invention, the peripheral throat has approximately the shape of a radially open "U".

According to another characteristic of the invention, the annular chamber defines at least one sealing lip on the moulded lining.

According to another characteristic of the invention, the body of said part has at least one injection channel fitted so as to allow circulation of the plastic material at the time the lining is moulded.

According to another characteristic of the invention, the mechanical part is used to form a piston in a pneumatic or hydraulic control cylinder.

In one preferred embodiment, the invention concerns a mechanical part intended to form the piston in a control cylinder known as a receiving cylinder for a brake or clutch circuit of a vehicle. The lining then firstly has at least one lip ensuring dynamic sealing, and secondly at least one lip ensuring static sealing.

The invention also concerns a mechanical part intended to form the piston in a control cylinder known as the transmitting cylinder for a brake or clutch circuit of a vehicle. The moulded lining then has firstly at least one functional guiding surface, and secondly at least one lip ensuring dynamic sealing.

Miscellaneous other characteristics of the invention appear in the following description with reference to the accompanying drawings which show non-restrictive examples of modes for embodying and implementing the subject of the invention.

Figure 1:
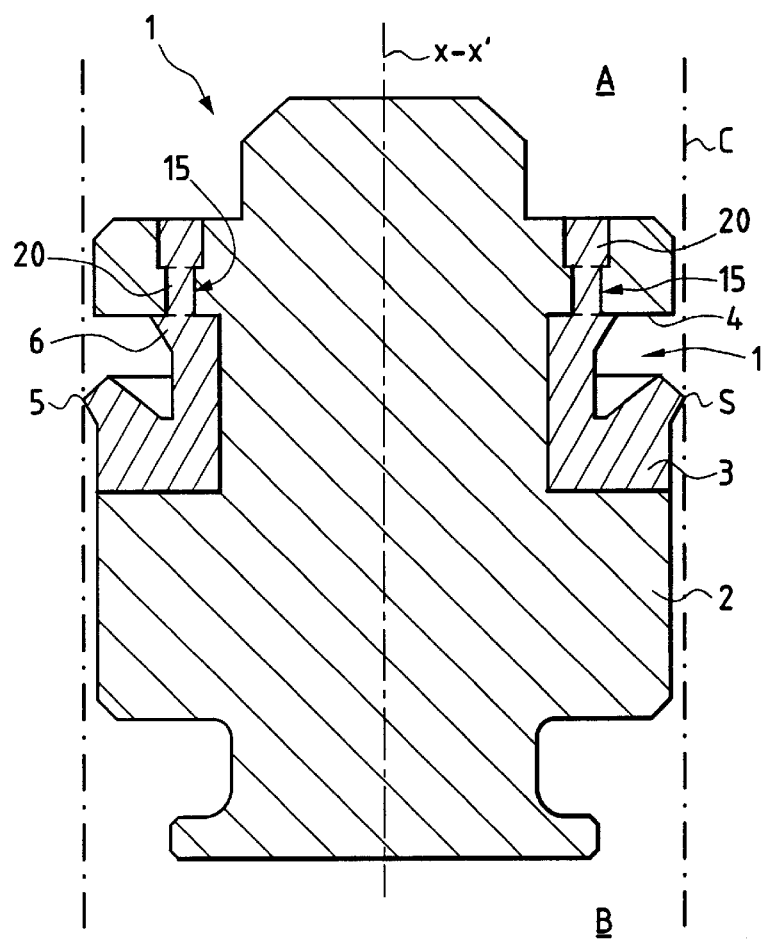
FIG. 1 is an axial section of a mechanical part conforming to the invention.

As shown on FIG. 1, the mechanical part of the invention denoted in its entirety by the reference 1 includes a body 2 provided with a plastic lining 3 defining at least one functional surface S in contact with another mechanical part C with respect to which the first mechanical part 1 is mobile.

As part of a preferred, but not exclusive, application, the mechanical part as shown on FIG. 1 is intended to form the piston of a control cylinder C known as a receiving cylinder for a hydraulic braking or clutch circuit of a motor vehicle, such as a car. In a braking circuit, this receiving cylinder is more particularly known as a wheel cylinder owing to its position on the vehicle. Moreover, this cylinder is called a receiving cylinder as it ensures the transformation of the hydraulic energy of the circuit into a mechanical work as opposed to a control cylinder known as a transmitting cylinder which transforms a mechanical energy into hydraulic energy. Such is the case for example in a braking circuit of the transmitting cylinder known as the master cylinder which transforms the pressure exerted on the brake pedal into hydraulic pressure in the circuit.

The body 2 of the mechanical part or piston 1 preferably has for this application a symmetry of revolution with axis x–x' and more generally a form being inscribed in a cylinder with a circular cross section.

The body 2 can be made of any suitable material and preferably of plastic. The body 2 could also be made of metal.

The body 2 also has a throat 4 inside which the plastic lining 3 is housed which provides a sealing function by defining a lip 5 determining the functional surface S intended to be in contact with the walls C of the control cylinder. The lining 3 also has an internal lip 6 which ensures static sealing at the level of the body 2 of the piston. Thus, the lining 3 is able to delimit inside the cylinder C and on both sides of the piston 1 two compartments A and B separated sealed by the lips 5 and 6.

According to one main characteristic of the invention, the lining is made of plastic and preferably, but not exclusively, of elastomer, such as natural or synthetic rubber, moulded on the body 2 inside the throat 4.

Of course, the lining 3 could be embodied in another plastic material than rubber which would able to be moulded on the body 2 and which would have mechanical characteristics compatible with the function of the lining 3.

Figure 2:
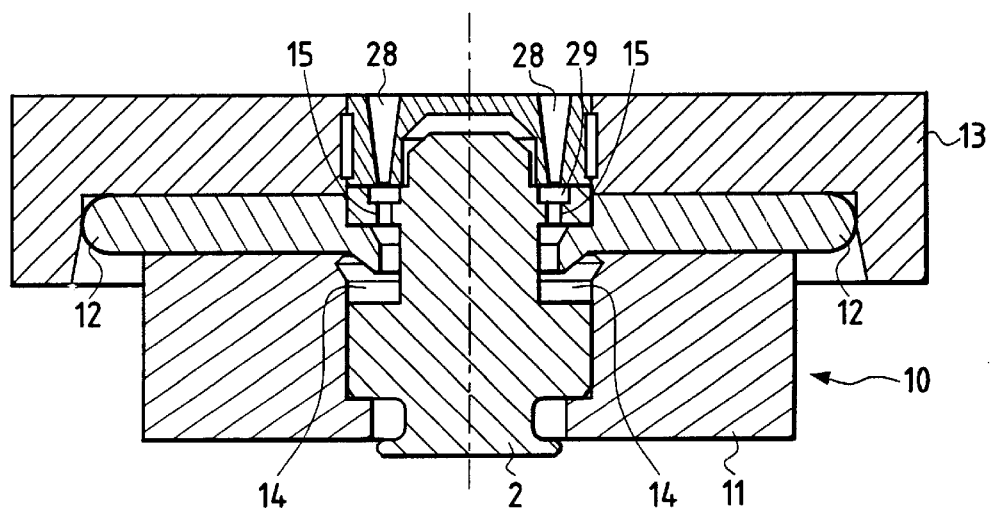
FIG. 2 is an axial section illustrating a method for producing the mechanical part of the invention in a plastic injection mould.

According to a method conforming to the invention, the production of the part 1, after production of the body 2, brings about a moulding of the lining 3. To achieve this end and as shown on FIG. 2, the body 2 is for example introduced into a mould 10 inside which the plastic material constituting the lining 3 is injected.

Of course, the moulding of the lining 3 could be carried out according to a method other than injection and suitable for the nature of the plastic material used and the function of the lining 3 on the mechanical part 2.

When the lining 3 surrounds at least one portion of the body 2 according to a preferred form for implementing the method, the production of the part 1 consists of placing the body 2 as a central core in the main body 11 of the mould 10. At least one secondary core 12 is used and, according to the example shown, two secondary cores 12 which are preferably complementary and being partially inserted in the moulding throat 4 so as to create an internal functional shape or chamber 41. It ought to be mentioned that the throat 4 preferably has an approximately radially open "U" shape and that the secondary cores 12 surround the body 2 having their recess inserted in the throat 4.

Finally, the mould 10 is closed with the aid of an injection body 13.

Next, the plastic material is injected into the mould so as to form the lining 3 around the body 2 at the level of the throat 4 in the space or indentation 14 delimited by the latter and the active portions of the secondary cores 12. According to one preferred, but not exclusive, embodiment of the body 2, this body have at least one and in the example shown several injection channels 15 disposed so as to allow during injection the passage of the plastic material.

After injection, the mould 10 is opened and the part 1 including the body 2 provided with the sealing lining 3 is removed.

Thus, the production of the part 1 advantageously involves no stress on the lining 3 situated on the body 2 in an idle condition. Moreover, the method of the invention greatly simplifies the design of the shape of the lining 3 as this shape is directly determined by the shaping of the indentation of the mould 10.

According to one preferred embodiment, each functional surface S of the lining 3 intended to be in contact with another mechanical part, as is the case with the functional surface of the lip 5, is defined by a single element constituting the mould 10 and, according to the example shown, by the moulding surface or indentation of the main body 11.

This characteristic advantageously makes it possible to obtain on the lining 3 a functional surface S having no parting line. This characteristic of the functional surface S, without any discontinuity, makes it possible to guarantee effectiveness of the dynamic sealing provided by the lining 3.

Moreover, the use of injection channels 15 on the body 2 is able to ensure a positive immobilisation in rotation of the lining 3 on the body 2 by the presence of moulding sprues 20 existing inside the channels 15 after embodiment of the lining 3. Thus, the presence of injection channels 15 disposed in the body 2 particularly and advantageously embodies effective anchoring of the lining 3 on said body 2, this anchorage favouring static sealing.

Similarly, the moulding of the lining 3 ensures good adherence to the body 2 without adding adhesive products.

It is also proper to mention that the moulding of the lining 3 on the body 2 avoids the lining being handled too frequently and therefore reduces as much as possible the risks of pollution of said lining by foreign particles.

Figure 3:
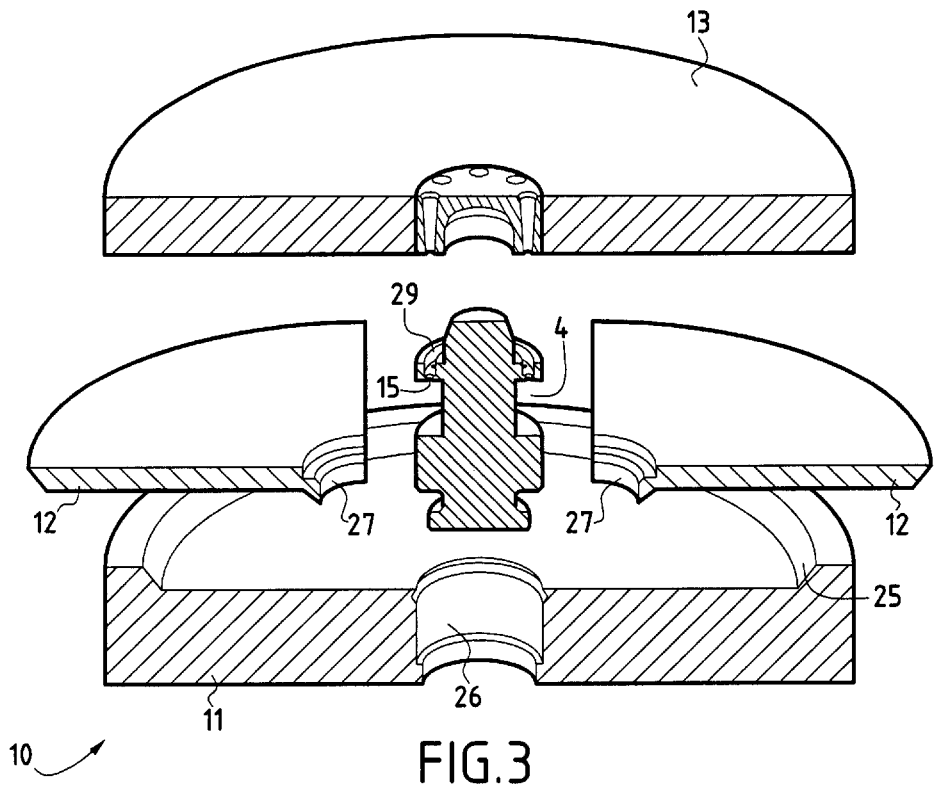
FIGS. 3 to 5 are views similar to FIG. 2 illustrating a preferred embodiment of the method for producing a mechanical part conforming to the invention and showing various phases for closing of the implemented mould.
Figure 4:
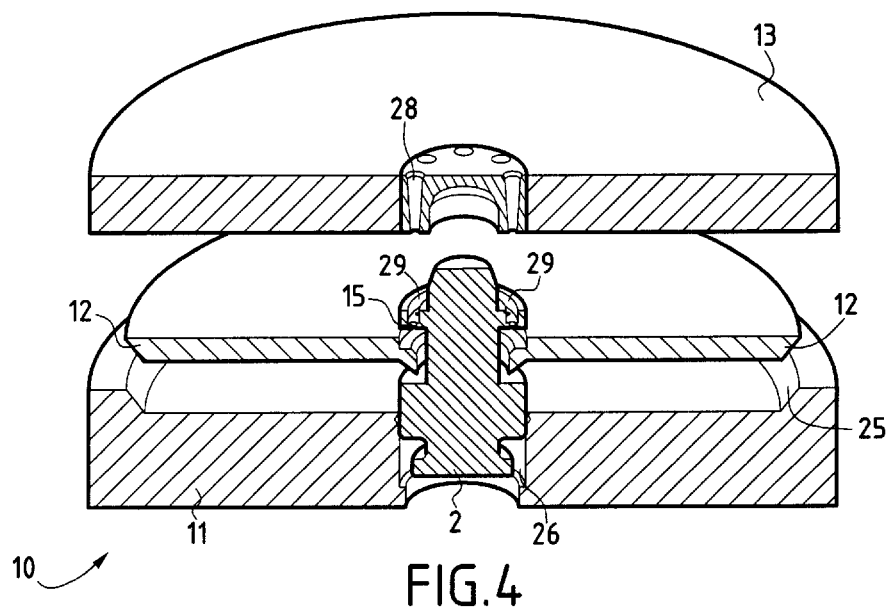
Figure 5:
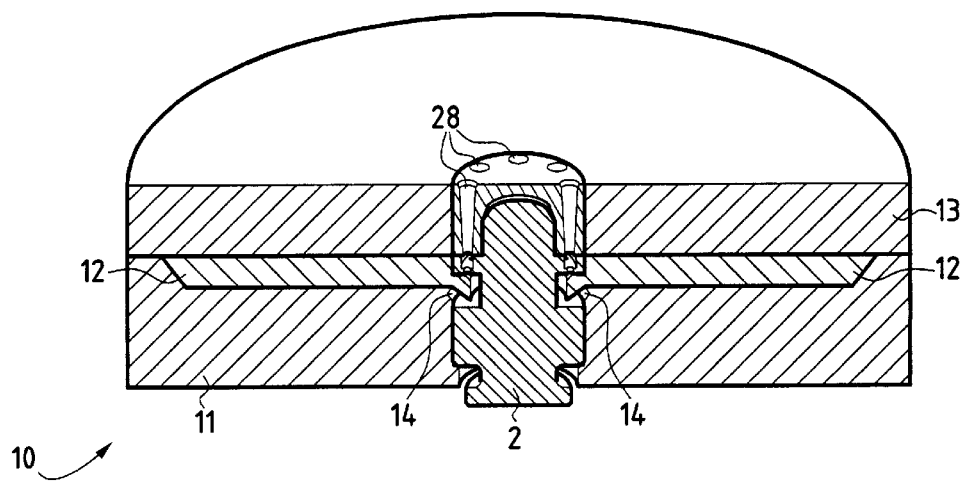

According to one preferred embodiment of the production method, the relative positioning of the various elements constituting the indentation of the mould is ensured by nesting these elements inside one another, as seen more particularly on FIGS. 3 to 5. This arrangement of the invention ensures observance by the functional surface S defined by the lining 3 of external dimensions required by the mould independently of all possible variations of the sides of the body 2.

Then it is no longer necessary to ensure dimensional control of the manufactured mechanical parts 1 and this dimensional control can then be replaced by a regular checking of the sides of the indentation of the mould. Thus, the method of the invention is able to improve production and control of mechanical parts and accordingly reduce the cost price.

So as to allow this relative positioning, each secondary core 12 has been designed so as to be nested inside an additional recess 25 shown by the main body 11 of the mould.

According to the example shown, the two secondary cores 12 are embodied in the form of two complementary half-disks intended to be nested in the recess 25 of the main body 11. This nesting, in addition to embodying a perfect positioning of the secondary cores 12 with respect to the main body, is able to provide imperviousness to the injected material of the indentation defined on the mould whilst allowing leak lines to exist for the air present in the indentation 14 prior to injection of the plastic material.

The contact surface of the half-disks with the complementary recess 25 is preferably truncated so as to provide a perfect relative positioning of the half-disks 12 in the main body 11.

Production of the part 1 occurs in the following stages.

First of all, the body 2 is arranged as a central core inside the main body 11 of the mould, as shown on FIG. 3. The correct positioning of the body 2 is ensured by nesting part of the latter in a complementary bore 26 of the main body 11.

During placing of the body 2, the secondary cores 12 are located so as to have their active portion or indentation 27 inside the corresponding throat 4 of the body 2, as shown on FIG. 4.

Next, the secondary cores are locked inside the truncated recess 25. The implementation of the secondary cores 12 which surround the body 2 on being partially engaged in the throat 4 is able to advantageously shape the annular chamber 4, in the lining 3 and thus define the dynamic sealing lip 5. The chamber 41 open radially or at its periphery contributes in providing effectiveness of the sealing provided by the lip 5 when implementing the part conforming to the invention.

After locking of the cores, the injection body 13 is placed so as to close the mould 10, as shown on FIG. 5.

After this stage for setting up the full mould, the process for producing the part 1 is continued as explained earlier by phases for injecting the plastic material and then opening the mould and extracting the mechanical part 1 of the invention.

As regards injection of the plastic material, it needs to be noted that the injection body has at least one and preferably several injection passages 28 for routing the plastic material towards the injection channels 15 of the body 2.

According to one preferred characteristic, so as to resolve the problem of the angular positioning of the body 2 inside the main mould body 11 to ensure perfect communication between the channels 15 and the passages 28, the body 2 has an annular throat 29 into which the channels 15 open and clear the passages 28. Moreover, this throat 29 allows a good distribution of the plastic material in the indentation 14 delimited by firstly the main body 11 and the secondary cores 12 of the mould, and secondly the body 2 of the mechanical part.

In the above examples, the production method has been shown by implementing a single-recess mould for moulding the lining at the same time on a single body. However, according to the invention, the mould used can be a multi-recess mould and thus allow several bodies be taken up during a single moulding operation. This mould then allows the simultaneous moulding of at least one lining on each body inserted in the mould.

Similarly, according to the above examples, two secondary cores are used but it is possible to use more than two.

What is claimed is:

1. Method for producing a mechanical part including a body provided with a plastic lining molded in a peripheral throat of the body, said lining defining at least a sealing lip comprising at least one functional surface in contact with another mechanical part with respect to which the first mechanical part is mobile, said method comprising the steps of:

using a mould including a main body comprising a molding surface intended to shape on its own said functional surface of the lining, and at least two complementary secondary cores;

having, as the central core, the body of the mechanical part in the main body of the mould;

placing the secondary cores by inserting at least in part the indentation of the secondary cores in the peripheral throat provided by the body of the mechanical part forming the central core, in order to define in the molded lining an annular chamber open radially and the sealing lip;

closing the mould;

injecting the plastic material;

opening the mould;

removing the secondary cores; and extracting the mechanical part from the main body of the mould.

2. Production method according to claim 1, further comprising the step of controlling the position of the secondary cores with respect to the body, to the position of the main body.

3. Production method according to claim 1, wherein the two complementary secondary cores nested inside the main body of the mould so that in a closed position of the mould, the position of the secondary cores is automatically controlled by this nesting.

4. Production method according to claim 1, wherein the plastic material is made of elastomer.

5. Production method according to claim 1, further comprising the steps of fitting in the body of the mechanical part at least one injection channel for passage of the plastic material making up the lining.

6. Production method according to claim 1, wherein the indentations of the main body of the mould and the secondary cores are shaped in order to define in the plastic lining a dynamic sealing lip and a static sealing lip.

7. Production method according to one of claims 1 to 6, wherein the mould is designed in such a way that each functional surface of the lining is shaped by only one of the elements making up the mould so as to have functional surfaces without any parting line.

\* \* \* \* \*